United States Patent
Ito (10) Patent No.: US 8,908,231 B2
(45) Date of Patent: Dec. 9, 2014

(54) IMAGE FORMING APPARATUS AND IMAGE PROCESSING METHOD THAT SELECTIVELY EMPHASIZE A SPECIFIC COLOR WHEN CONVERTING A MULTICOLORED IMAGE TO MONOCHROME

(75) Inventor: Shinsaku Ito, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 125 days.

(21) Appl. No.: 13/524,159

(22) Filed: Jun. 15, 2012

(65) Prior Publication Data
US 2012/0327488 A1 Dec. 27, 2012

Related U.S. Application Data (60) Provisional application No. 61/499,456, filed on Jun. 21, 2011.

(51) Int. Cl.
H04N 1/40 (2006.01)
H04N 1/62 (2006.01)

(52) U.S. Cl.
CPC ............ *H04N 1/40012* (2013.01); *H04N 1/62* (2013.01)
USPC ......................................... 358/3.01; 358/518

(58) Field of Classification Search
USPC ........... 358/518–523, 1.9, 2.1, 3.01; 382/173, 382/274, 282, 162–167
See application file for complete search history.

(56) References Cited

U.S. PATENT DOCUMENTS

| | | | |
|---|---|---|---|
| 7,652,799 B2 | 1/2010 | Mimura | |
| 8,259,355 B2* | 9/2012 | Miyagi | 358/2.1 |
| 2005/0243347 A1 | 11/2005 | Hayaishi | |
| 2006/0082836 A1 | 4/2006 | Mimura | |
| 2007/0166065 A1* | 7/2007 | Imamiya | 399/49 |
| 2010/0085610 A1 | 4/2010 | Mimura | |
| 2013/0070265 A1* | 3/2013 | Megawa et al. | 358/1.9 |

FOREIGN PATENT DOCUMENTS

| | | |
|---|---|---|
| JP | 2001-352454 | 12/2001 |
| JP | 2005-295508 | 10/2005 |
| JP | 2006-148866 | 6/2006 |
| JP | 2010-087550 | 4/2010 |
| JP | 2011-045052 | 3/2011 |

OTHER PUBLICATIONS

Notification of Reason(s) for Refusal for Japanese Patent Application No. 2012-138558 Dated Apr. 1, 2014, 3 pgs.

* cited by examiner

*Primary Examiner* — Barbara Reinier
(74) *Attorney, Agent, or Firm* — Amin, Turocy & Watson, LLP (57) ABSTRACT

An image forming apparatus of an embodiment includes an acquisition unit and a controller. The acquisition unit scans a sheet to acquire the color image of the sheet. The controller converts, using parameters stored in a storage unit, the color image acquired by the acquisition unit to a monochrome image with at least one specific color being darker than the other colors.

16 Claims, 6 Drawing Sheets

$$[\text{Mono}] = 255 * [D_{00} \quad D_{01} \quad D_{02} \quad D_{03} \quad D_{04} \quad D_{05} \quad D_{06} \quad D_{07} \quad D_{08} \quad D_{09}] \begin{bmatrix} R_i \\ G_i \\ B_i \\ R_i^2 \\ G_i^2 \\ B_i^2 \\ R_i G_i \\ G_i B_i \\ B_i R_i \\ 1 \end{bmatrix}$$

Fig. 6

IMAGE FORMING APPARATUS AND IMAGE PROCESSING METHOD THAT SELECTIVELY EMPHASIZE A SPECIFIC COLOR WHEN CONVERTING A MULTICOLORED IMAGE TO MONOCHROME

CROSS-REFERENCE TO RELATED APPLICATION

This application is based upon and claims the benefit of priority from: U.S. provisional application 61/499,456, filed on Jun. 21, 2011; the entire contents all of which are incorporated herein by reference.

FIELD

Embodiments described herein relate generally to a technique used to legibly print a sheet printed with a color material of a specific color.

BACKGROUND

Low-color density color materials, mainly such as blue color materials, are being used as color materials that can be decolorized using a decolorizing apparatus.

When a document printed with such a decolorable color material of a specific color is read and copied, the density of the scanned and read image (input density) is lower than that when a general black color material is used. When the read image is printed on a sheet, the density of toner on the sheet (output density) becomes low because the color is reproduced with the color of the used color material. Therefore, the reproduced color is further lighter, so that the image printed on the sheet is hard to read.

To legibly print, using a conventional monochrome image forming apparatus, a document printed with a color material of a specific color, it is necessary to adjust image quality by the user through a touch panel or to adjust the density of the image using self-diagnostic adjustment set by a serviceman. However, in this case, to obtain the print results desired by the user, it is necessary to repeat printing several times to check the results.

In addition, when a color document is scanned in monochrome such as grayscale, the color image is converted to a monochrome image. In the converted monochrome image, the color of the color material printed on the scanned original sheet (for example, blue) cannot be distinguished from the colors of notes and stains on the sheet (for example, black and brown). Therefore, when the output density is set to be high to make the print results legible, the notes and stains are also emphasized.

DETAILED DESCRIPTION

An image forming apparatus in an embodiment includes an acquisition unit and a controller. The acquisition unit scans a sheet to acquire the color image of the sheet. The controller converts, using parameters stored in a storage unit, the color image acquired by the acquisition unit to a monochrome image with at least one specific color being darker than the other colors.

In the image forming apparatus of the present embodiment, a document printed with, for example, a decolorable toner is read by a color scanner, and the color density of the read image is converted to appropriate density scale based on the color of the document. A specific color such as the color of the decolorable toner can thereby be emphasized.

In the image forming apparatus of the present embodiment, a mode in which a document printed with a color material of a specific color is outputted in a dark color is provided separately from a normal mode for documents printed with a black color material. This allows copying and scanning with the specific color being emphasized to be performed by a simple one-touch operation through a touch panel without causing the user to repeatedly check image reproduction results.

In the description of the present embodiment, the specific color is the color of a decolorable toner that can be decolorized by a decolorizing apparatus (for example, a blue-based color). A description will be given of the operation of darkening and emphasizing the specific color when a color document is printed in monochrome. The specific color is not limited to the blue-based color and can be any color desired by the user. The user can specify any desired specific color by changing parameters when the image forming apparatus is constructed before shipment and even after the shipped image forming apparatus is in operation.

Monochrome means that a single color is used to reproduce halftones. In the present embodiment, black color is used to reproduce halftones (to represent grayscale).

The terms "dark" and "darkened" are used to include a low lightness state and the behavior in which lightness is decreased. In a monochrome image (a grayscale image), these terms are used to include a color closer to black than white and the behavior in which color changes from white to black. The terms "light" and "lightened" are used to include a high lightness state and the behavior in which lightness is increased. In a monochrome image (a grayscale image), these terms are used to include a color closer to white than black and the behavior in which color changes from black to white.

Figure 1:
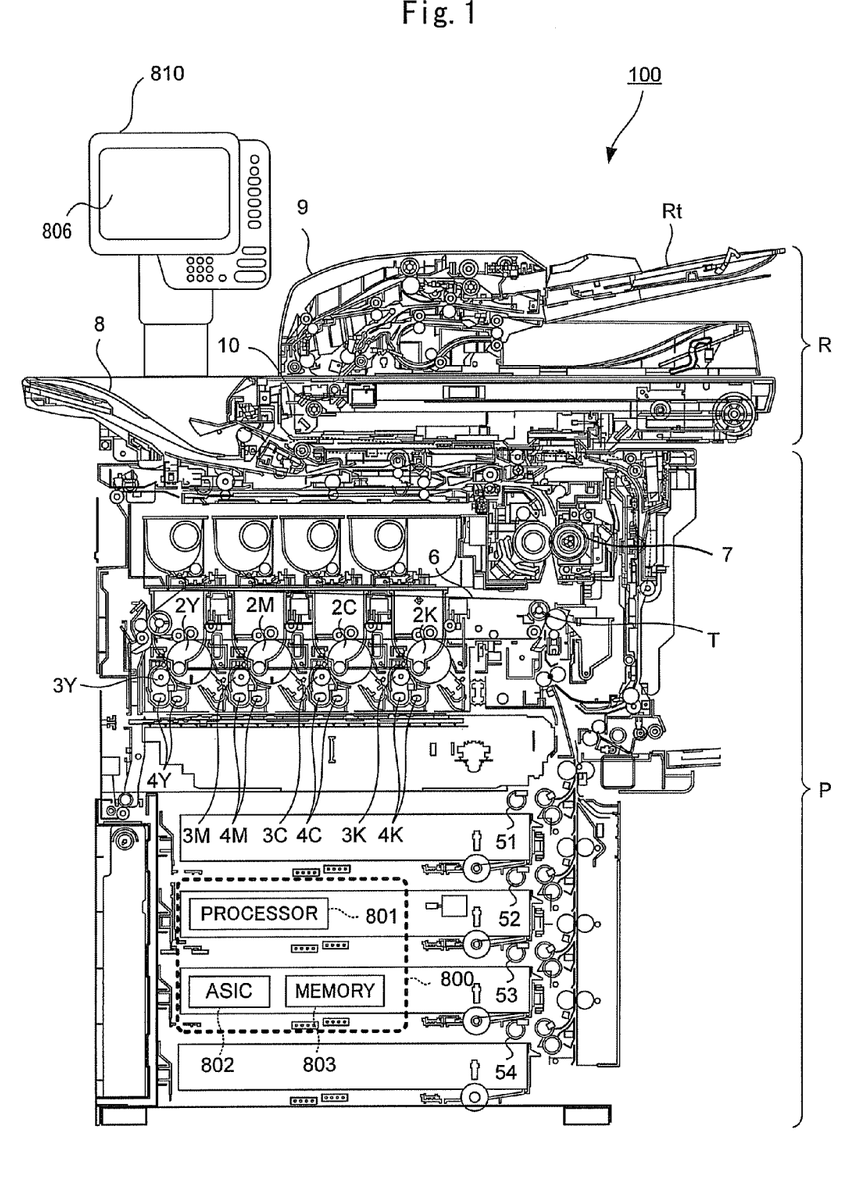
FIG. 1 is a diagram illustrating an example of the configuration of an image forming apparatus.

FIG. 1 is a vertical cross-sectional view illustrating the configuration of the image forming apparatus in the present embodiment. As shown in FIG. 1, the image forming apparatus 100 according to the present embodiment is an MFP (Multi Function Peripheral) that performs print processing, scan processing, and FAX transmission/reception and includes an image reading unit R. (an acquisition unit) and an image forming unit P.

The image reading unit R scans and reads the image of a sheet document and the image a book document. The image reading unit R includes an auto document feeder (ADF) 9 that conveys documents to a prescribed image reading position. A reading device 10 reads the images of documents placed on a document tray (a prescribed document placing table) Rt and conveyed by the auto document feeder 9 and the image of a document placed on a document table (not shown).

The reading device 10 includes a light-emitting element and a CCD (Charge Coupled Device) image sensor. The light-emitting element irradiates a document placed on a light-transmitting board with visible light. The CCD image sensor receives light reflected by the document via a reflecting mirror and converts the received light to electronic data. The CCD image sensor in the present embodiment includes two sensors, i.e., a color sensor and a monochrome sensor. However, it is sufficient to provide at least a color sensor.

The image forming unit P forms a developer image on a sheet from, for example, the image of a document read by the image reading unit R or image data transmitted from an external device (for example, a personal computer) to the image forming apparatus 100. The image forming unit P includes pickup rollers 51 to 54, photosensitive members 2Y to 2K, developing rollers 3Y to 3K, mixers 4Y to 4K, an intermediate transfer belt 6, a fixing unit 7, and a discharge tray 8.

The image forming apparatus 100 further includes a control board 800 (controller). The control board 800 includes: a processor 801 which is an arithmetic processing unit (for example, a CPU (Central Processing Unit) or an MPU (Micro Processing Unit)), an ASIC (Application Specific Integrated Circuit) 802, and a memory 803 including a volatile storage unit and a non-volatile storage unit. The processor 801 plays a role in performing various types of processing in the image forming apparatus 100, loads a program stored in a non-volatile storage area of the memory 803 into a volatile storage area thereof, and executes the loaded program. Various functions are thereby implemented. The memory 803 can be composed of, for example, a RAM (Random Access Memory), a ROM (Read Only Memory), a DRAM (Dynamic Random Access Memory), an SRAM (Static Random Access Memory), a VRAM (Video RAM), a hard disk drive, and the like and stores various types of information and programs used in the image forming apparatus 100. The ASIC 802 performs various types of image processing on document data read by the image reading unit R and on image data obtained by an external device.

The image forming apparatus 100 includes a control panel 810 having a touch panel display 806. The control panel 810 receives various instructions such as a mode switching instruction and a start instruction from the user through the touch panel display 806 and displays the details of processing to the user.

A description will next be given of the outline of copy processing as an example of the processing in the image forming apparatus 100 according to the present embodiment.

First, sheets picked up from a cassette by one of the pickup rollers 51 to 54 are supplied to a sheet conveying path. The sheets supplied to the sheet conveying path are conveyed in a prescribed conveying direction by a plurality pairs of rollers.

Then the images of a plurality of sheet documents continuously and automatically conveyed by the auto document feeder 9 are read at a prescribed image reading position by the reading device 10.

Next, the control board 800 performs image processing on the data of the image of each document read by the image reading unit R. On the basis of the data having been subjected to image processing, electrostatic latent images are formed on the photosensitive surfaces of the photosensitive members 2Y, 2M, 2C, and 2K that transfer yellow (Y), magenta (M), cyan (C), and black (K) developer images on a sheet.

Then the developing rollers (so-called as mag rollers) 3Y to 3K supply developers stirred by the mixers 4Y to 4K in a developing unit to the photosensitive members 2Y to 2K having the electrostatic latent images formed thereon. The electrostatic latent images formed on the photosensitive surfaces of the photosensitive members 2Y to 2K are thereby visualized.

The developer images formed on the photosensitive members are transferred onto the belt surface of the intermediate transfer belt 6 (primary transfer). The developer images conveyed by the rotation of the intermediate transfer belt 6 are transferred onto the conveyed sheets at a prescribed second transfer position T.

The developer images transferred onto the sheets are heated and fixed by the fixing unit 7. The sheets having the developer images fixed thereon by heating are conveyed through the conveying path by a plurality of pairs of rollers and sequentially discharged to the discharge tray 8.

When image data to be printed is in grayscale, the mixer, the developing roller, and the photosensitive member for black color (K) are activated, but units for the other colors are not activated.

Figure 2:
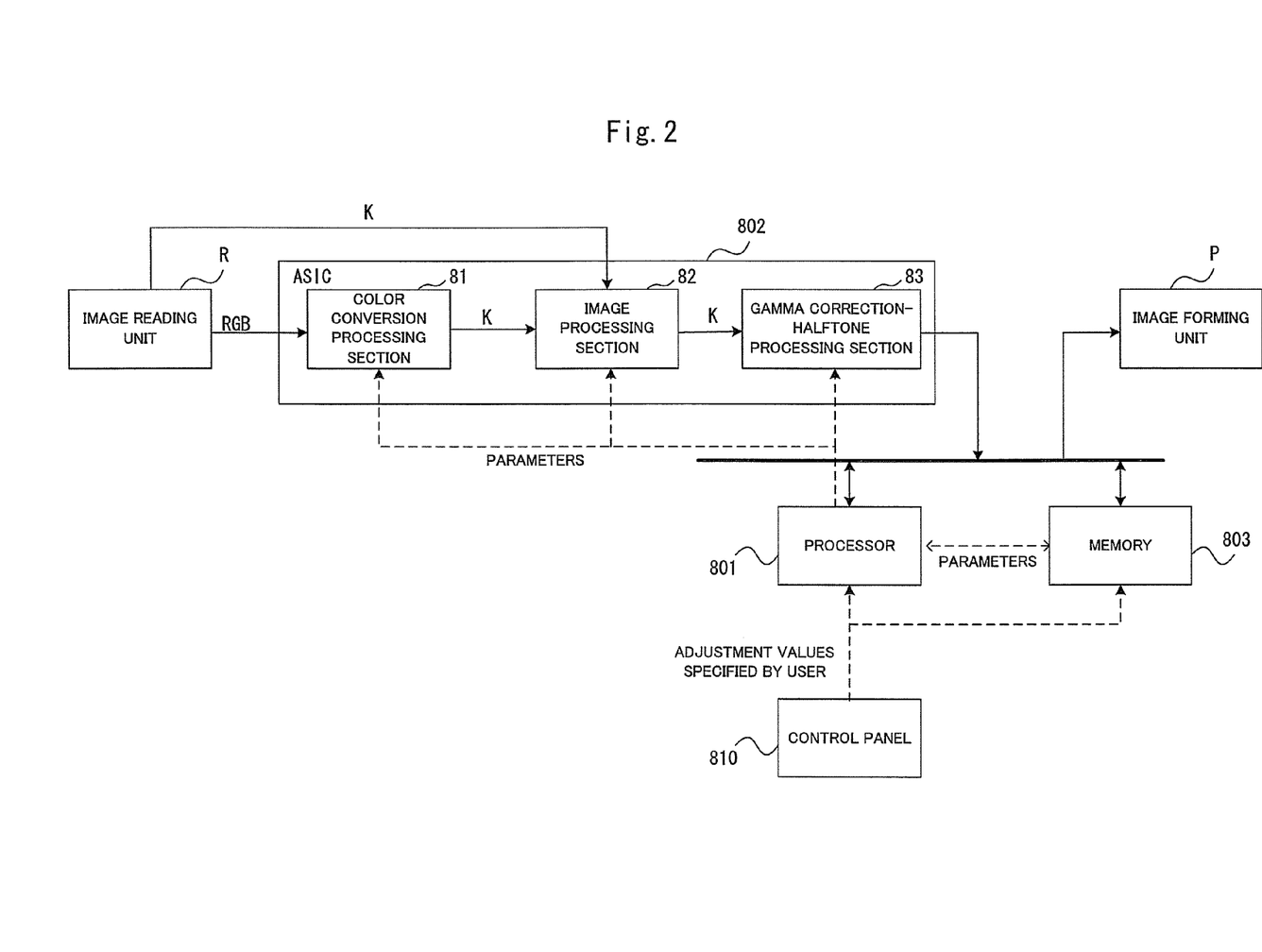
FIG. 2 is a block diagram mainly illustrating an example of the internal configuration of a control board in the embodiment.

FIG. 2 is a block diagram mainly illustrating an example of the internal configuration of the control board 800. As described above, the control board 800 includes the processor 801, the ASIC 802, and the memory 803. In the present embodiment, the ASIC 802 includes a color conversion processing section 81, an image processing section 82, and a gamma correction-halftone processing section 83 that are implemented by integrated circuits. Part or all of the color conversion processing section 81, the image processing section 82, and the gamma correction-halftone processing section 83 may not be implemented in the ASIC but may be implemented as a PLD (programmable logic device). These sections may be implemented as processes executed by cooperation of the processor 801, the memory 803, and programs. In this case, the processor 801 loads a program pre-stored in the memory 803 and then performs computations.

The color conversion processing section 81 acquires, from the image reading unit R, red (R), green (G), and blue (B) scan signals (color images) read by the image reading unit R and performs color conversion processing to convert the scan signals to a monochrome signal (K) (a monochrome image) with appropriate density scale.

The color conversion processing section 81 converts, using parameters stored in the memory 803, the color images acquired by the image reading unit R to a monochrome image with a specific color being darker than the other colors. When the color conversion processing section 81 converts the color image acquired by the image reading unit R to the monochrome image, colors other than the specific color are lightened. The details of the operation of the color conversion processing section 81 will be described later.

The image processing section 82 acquires monochrome image data and performs various types of image processing using conventional techniques. When scan processing is performed, the image data processed by the image processing section 82 is converted to data in a prescribed format that is recognizable by a personal computer and the like, and the converted data is stored in the memory 803 or an external storage device.

The gamma correction-halftone processing section 83 acquires the monochrome image data from the image processing section 82 and performs gamma correction in consideration of the characteristics of the output device of the image forming unit P. The gamma correction-halftone processing section 83 also performs processing for representation of halftones using dithering and the like. The image data processed by the gamma correction-halftone processing section 83 is outputted to the image forming unit P and printed on a sheet.

When print processing or scan processing is performed, the control panel 810 acquires respective adjustment values (such as the value of a predefined mode and the degree of toner output density) from the user, and the adjustment values are passed to the processor 801 and the memory 803. When no mode instruction is given by the user, default adjustment values are passed to the processor 801 and the memory 803.

The memory 803 stores a mode value and its associated parameters to be passed to the ASIC 802. When there are a plurality of modes, these mode values and their associated parameters are stored in the memory 803. The processor 801 acquires parameter values for a given mode value from the memory 803 and writes the acquired parameter values in a register in the ASIC 802. The color conversion processing section 81, the image processing section 82, and the gamma correction-halftone processing section 83 in the ASIC 802 acquire these parameters from the register and perform processing using the parameters. Note that the parameter values can be modified even after the shipment of the image forming apparatus 100.

Figure 3:
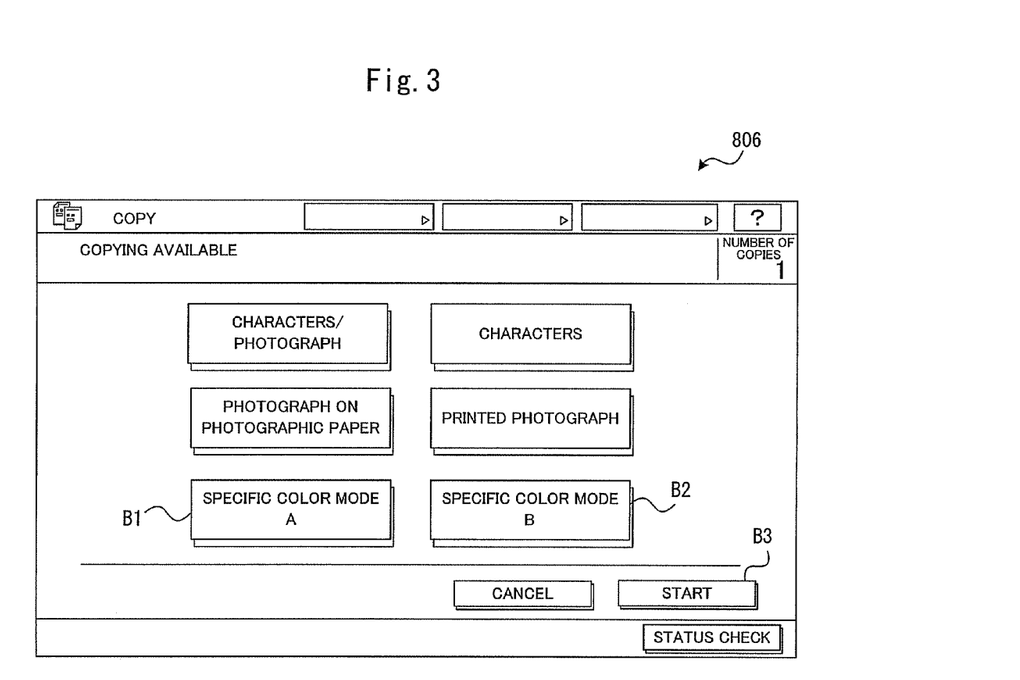
FIG. 3 is a diagram illustrating an example of a mode selection screen displayed on a control panel in the embodiment.

Buttons B1 and B2 for specific color modes are provided on the touch panel 806 of the control panel 810, as shown in FIG. 3. When one of these buttons is pressed and then a start button B3 is pressed, the image reading unit R reads document data through the color sensor, and the color conversion processing section 81 converts the color image to a monochrome image with appropriate density scale according to the colors of the document. When the start button B3 is pressed with none of the buttons B1 and B2 selected, a normal (default) mode is used.

In the present embodiment, two specific color modes are provided. These two specific color modes include: "specific color mode A" in which monochrome conversion is performed with the blue-based color of a decolorable toner being emphasized while the other colors are lightened or are not used for image formation; and "specific color mode B" in which monochrome conversion is performed with the blue-based color of the decolorable toner and the color of handwriting (black-based color) being emphasized while the other colors are lightened or are not used for image formation. When one of the "specific color mode A" button B1 and the "specific color mode B" button B2 is pressed, reading is performed in the selected specific color mode, and image processing is performed. When none of the buttons B1 and B2 is pressed, the image reading unit R performs a default operation, i.e., scanning, to obtain document data as a single monochrome signal (K), and then the image processing section 82 and the gamma correction-halftone processing section 83 perform image processing.

Figure 4:
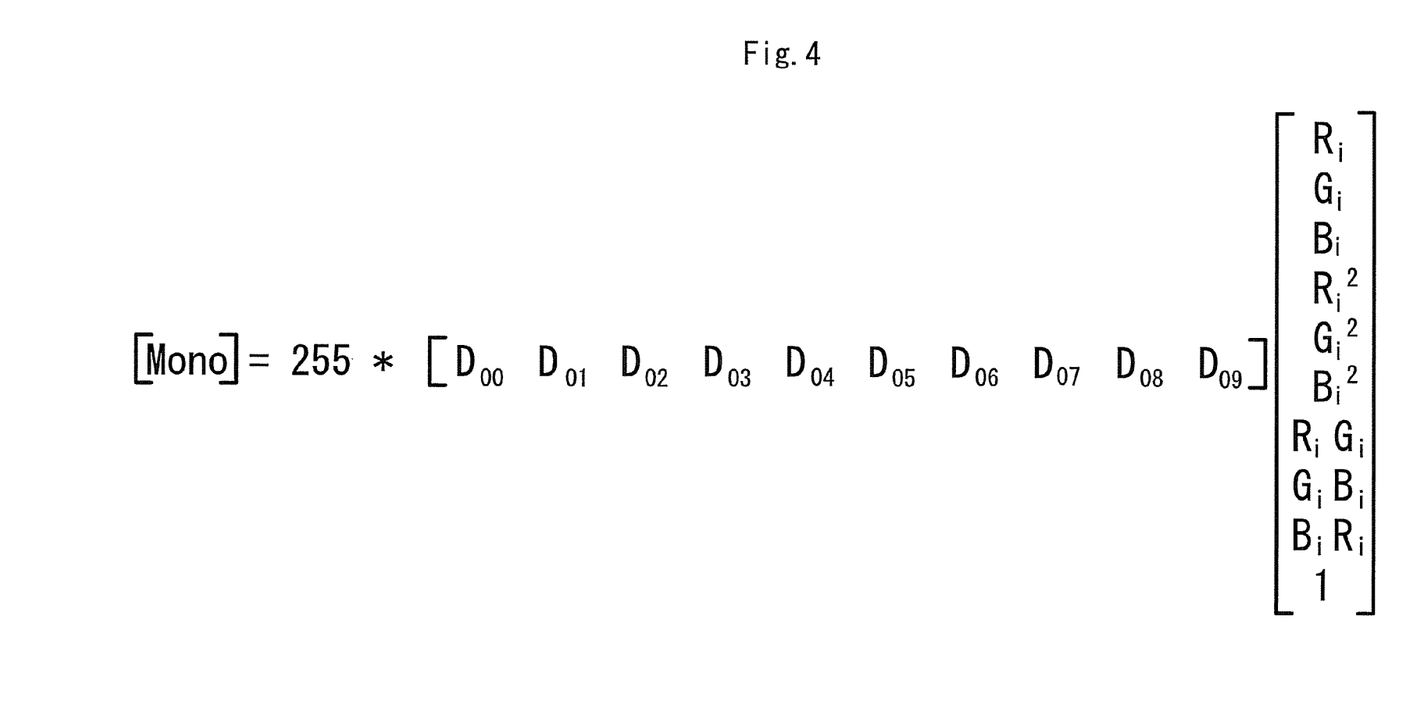
FIG. 4 is a diagram showing an example of a calculation formula used for color conversion processing in the embodiment.

FIG. 4 shows an example of a calculation formula used in the color conversion processing section 81 to convert R, G, and B values to a monochrome value (K). In FIG. 4, "Mono" is a monochrome value in the range of 0 to 255, and $D_{00}$ to $D_{09}$ are coefficients (parameter values). $R_i$, $G_i$, and $B_i$ are RGB signal values obtained by the image reading unit R. In the present embodiment, the values of $R_i$, $G_i$, and $B_i$ are in the range of 0 to 255. The color when all the $R_i$, $G_i$, and $B_i$ values are 0 is white, and the color when all the $R_i$, $G_i$, and $B_i$ values are 255 is black. The color when the monochrome value is 0 is white (no toner is outputted onto a sheet). The density of the color increases as the monochrome value increase, and the color when the monochrome value is 255 is black. Each of $D_{00}$ to $D_{09}$ can be any real number from 0 to 1, and $D_{00}$ to $D_{09}$ are selected such that the sum thereof is 1.

The color conversion processing section 81 computes the inner product of a row vector composed of the coefficients $D_{00}$ to $D_{09}$ with a column vector composed of the respective signal values $R_i$, $G_i$, and $B_i$, $R_i^2$, $G_i^2$, and $B_i^2$ (squares of the respective signal values $R_i$, $G_i$, and $B_i$), $R_iG_i$, $G_iB_i$, $B_iR_i$ (products of $R_i$, $G_i$, and $B_i$), and a constant 1. In this example, the value of the inner product is multiplied by a constant 255, and the resultant value is used as the monochrome value. This is to normalize the value of the inner product to the scale of the monochrome value.

In the specific color mode A in which the color of the decolorable toner is emphasized, coefficients to be multiplied by the value representing blue color being the color of the decolorable toner are enhanced, and the other coefficients are reduced. More specifically, the values of coefficients $D_{02}$, $D_{05}$, and $D_{07}$ to be multiplied by $B_i$, $B_i^2$, and $G_iB_i$, which are blue-based color data, are set to be large, and the values of the other coefficients $D_{00}$, $D_{01}/D_{03}$, $D_{04}/D_{06}$, $D_{08}$, and $D_{09}$ are set to be small. For example, the coefficients are set such that the smallest one of the coefficients $D_{02}$, $D_{05}$, and $D_{07}$ is larger than the largest one of the coefficients $D_{00}$, $D_{01}$, $D_{03}$, $D_{04}$, $D_{06}/D_{08}$, and $D_{09}$. This allows printing to be performed with the color of the decolorable toner being darkened while the other colors such as the colors of notes and stains are lightened (or are not printed).

When the "specific color mode B" in which the color of the decolorable toner and black color (the color of notes) are emphasized is selected, the same operation can be applied. Namely, since the coefficients used are set differently from the coefficients used for the "specific color mode A," the color of the decolorable toner and the black color are similarly emphasized.

The $R_i$, $G_i$, and $B_i$ signal values, the outputted grayscale value of the monochrome value, and the values of the coefficients $D_{00}$ to $D_{09}$ are not limited to the above values. The value of black color may be 0, and the value of white color may be 255. The range of possible values may not be 0 to 255. It is not necessary that the sum of $D_{00}$ to $D_{09}$ be 1 and that $D_{00}$ to $D_{09}$ be real numbers from 0 to 1. These depend on the toner output characteristics of the image forming unit P, the design specifications of the ASIC 802, and the like.

The calculation formula shown in FIG. 4 is only an example, and any calculation formula that uses at least the values of R, G, and B and also uses coefficients (parameters) for weighting these values may be used.

Figure 5:
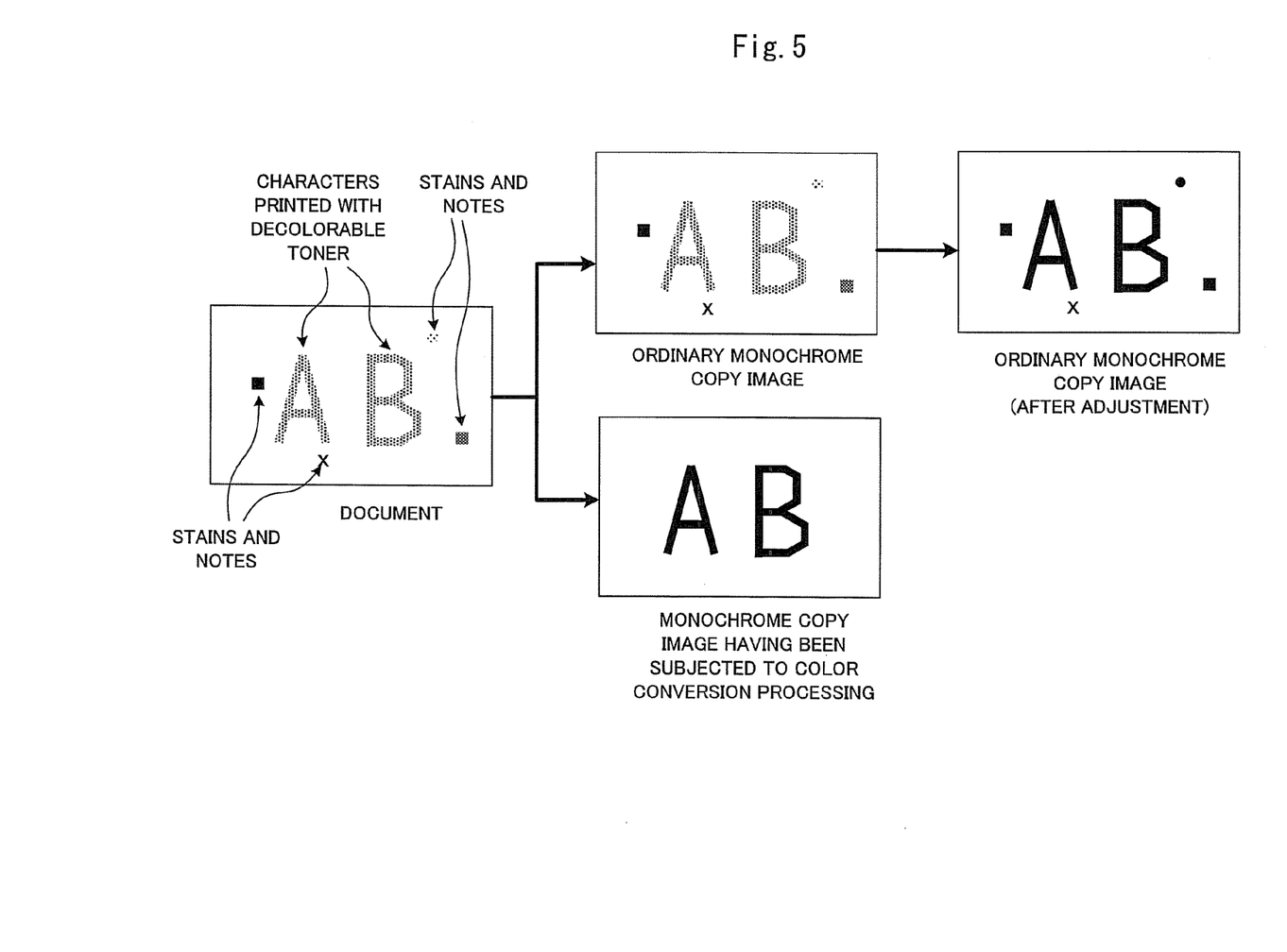
FIG. 5 is a diagram illustrating an example of print results when a normal mode has been selected and an example of print results when a specific color mode has been selected.

Referring to FIG. 5, a description will be given of processing results in a normal (default) mode and processing results when the color conversion processing section 81 is used. In FIG. 5, adjusted image data processed in the normal mode is shown in the upper row, and adjusted image data when the "specific color mode A" has been selected is shown in the lower row. In FIG. 5, letters "A" and "B" on a document to be processed have been formed using the decolorable toner. There are also handwriting by the user and stains on the document.

When monochrome printing is performed in the normal mode, the handwriting and stains remain present in the data after image processing (the upper row in FIG. 5). However, when the user has pressed the button B1 shown in FIG. 3 to select the specific color mode A, the color image is converted to a monochrome image using the calculation formula shown in FIG. 4. Therefore, the color of the decolorable toner (the specific color) is emphasized, and the other colors are removed or lightened (the lower row in FIG. 5).

As described above, in the present embodiment, the buttons B1 and B2 corresponding to the mode in which a specific color such as the color of a decolorable toner is emphasized (the specific color mode A) and the mode in which blue and black colors are emphasized (the specific color mode B) are provided on the document mode selection screen on the touch panel 806. Therefore, the processor 801 can acquire the mode value desired by the user. A matrix table for the coefficients for the specific color mode A and a matrix table for the coefficients for the specific color mode B are pre-stored in the memory 803, and the processor 801 acquires the values in the matrix table corresponding to a given mode value and sets the acquired values in a register in the ASIC 802.

The monochrome image data converted by the color conversion processing section 81 is then subjected to various types of image processing by the image processing section 82 and the gamma correction-halftone processing section 83. When print processing is performed, the image forming unit P forms on a sheet the image having been subjected to the above-described color conversion processing. When scan processing is performed, the image having been subjected to the color conversion processing is stored in the memory 803.

Figure 6:
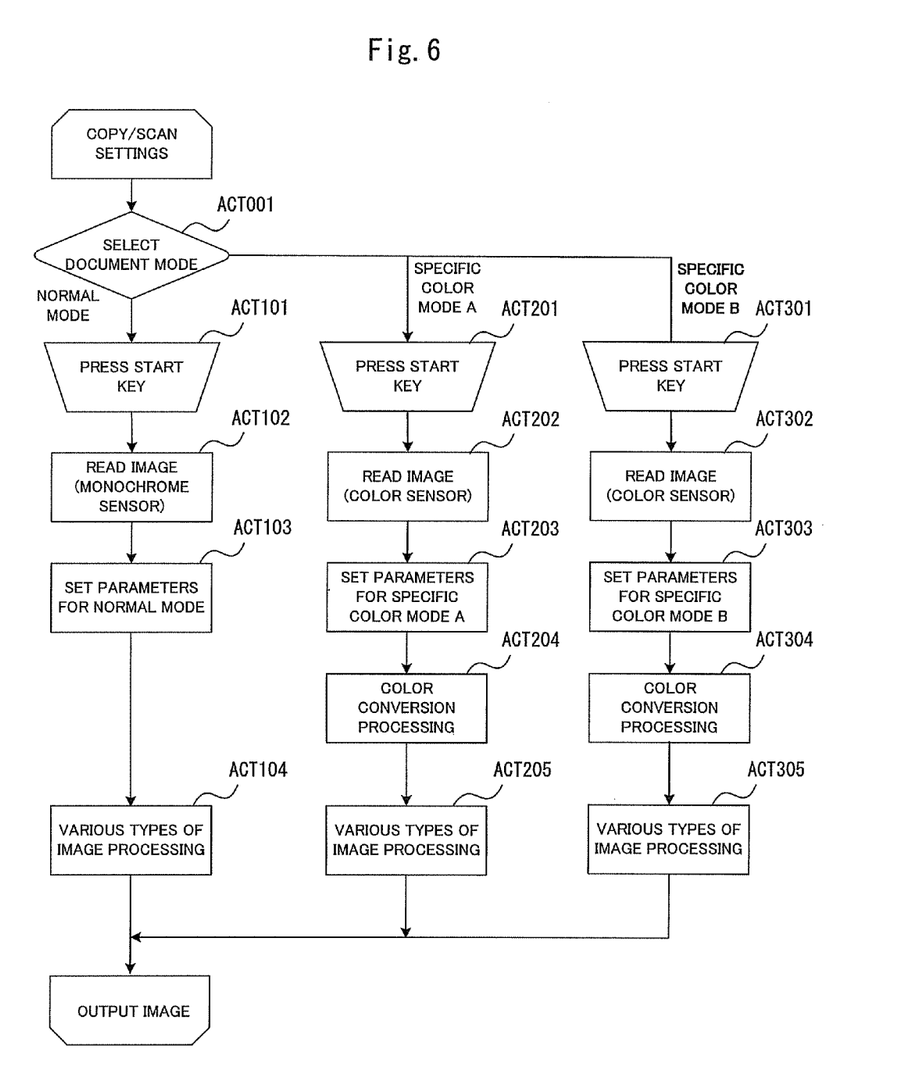
FIG. 6 is a flow chart showing an example of the operation of the image forming apparatus in the embodiment.

Referring next to a flow chart shown in FIG. 6, an example of the operation of the image forming apparatus 100 will be described.

First, the user selects a mode value, the value of the degree of density, and the like through the mode selection screen shown in FIG. 3 (ACT001) and then presses the start button B3. If none of the buttons B1 and 132 has been pressed, the operation is performed in the normal mode, and the processing in ACT101 to ACT104 is performed. If the button B1 has been pressed, the operation is performed in the specific color mode A, and the processing in ACT201 to ACT205 is performed. If the button B2 has been pressed, the operation is performed in the specific color mode B, and the processing in ACT301 to ACT305 is performed.

In the normal mode, when the start button B3 is pressed (ACT101), the image reading unit R reads a document through the monochrome sensor (ACT102). When an image forming apparatus including only a color sensor is used, the color sensor can read the document.

The processor 801 acquires the parameters for the normal mode from the memory 803 and sets the acquired parameters in a register in the ASIC 802 (ACT103). Then the image processing section 82 and the gamma correction-halftone processing section 83 perform various types of image processing using the parameters set in the register (ACT104).

When the specific color mode A is selected in ACT001 and then the start button B3 is pressed (ACT201), the image reading unit R reads the document image using the color sensor (ACT202). The processor 801 acquires the parameters for the specific color mode A from the memory 803 and sets the acquired parameters in a register in the ASIC 802 (ACT203). The parameters for the specific color mode A include coefficients $D_{00}$ to $D_{09}$ for emphasizing the color of the decolorable toner.

The color conversion processing section 81 acquires the coefficients $D_{00}$ to $D_{09}$ from the register, also acquires the signal values ($R_i$, $G_i$, and $B_i$) read by the image reading unit R, and calculates monochrome values using the calculation formula shown in FIG. 4 (ACT204). This processing is performed for each of the pixels in the target image data.

The monochrome image having been subjected to color conversion in the color conversion processing section 81 is then subjected to various types of image processing in the image processing section 82 and the gamma correction-halftone processing section 83 (ACT205).

When the specific color mode B is selected in ACT001 and then the start button B3 is pressed (ACT301), the document is read using the color sensor (ACT302), and the parameters for the specific color mode B are set (ACT303). Then various types of processing including the color conversion processing (ACT304) and various types of image processing (ACT305) are performed. These various types of processing are the same as those performed when the specific color mode A is selected except that different parameters are set in ACT303 (see ACT201 to ACT205).

In the description of the above example, the color of the decolorable toner is used as the specific color. However, by modifying and adjusting the coefficients $D_{00}$ to $D_{09}$ any color can be emphasized as the specific color, and any color other than the specific color can be lightened or removed.

In the description of the above example, the ASIC acquires the read $R_i$, $G_i$, and $B_i$ values and the coefficients $D_{00}$ to $D_{09}$ pre-defined such that the specific color is darkened and performs color conversion using the calculation formula shown in FIG. 4. Another embodiment different from the above embodiment is possible. More specifically, for example, at least one threshold value is defined for each of R, G, and B in advance, and these threshold values are compared with the read R, G, and B values (hereinafter the R, G, and B values read by the image reading unit R are referred to as scanned values) to darken the specific color desired by the user. For example, the design values or actually measured values of the R, G, and B values of the decolorable toner are obtained in advance, and the threshold values of the allowable ranges of the R, G, and B values of the decolorable toner are set. When the scanned values of a pixel are in the ranges of the threshold values, the monochrome value of the pixel is set to a high value (for example, 255), and the output color of the pixel is thereby darkened. When the scanned values of a pixel are outside the above ranges, the monochrome value of the pixel is set to a low value (for example, 0), and the color of the pixel is not outputted or is outputted as a light color. When a plurality of modes are provided, threshold values are, of course, set for each mode.

The color conversion processing using the threshold values and the color conversion processing using the calculation formula shown in FIG. 4 may be combined. For example, the number of colors is reduced by the threshold value processing, and then color conversion processing is performed using the calculation formula shown in FIG. 4. The order of the threshold value processing and the processing using the calculation formula in FIG. 4 is not limited to the above order, and the inverse order may be used.

In the above example, one matrix table (a set of the coefficients $D_{00}$ to $D_{09}$ in FIG. 4) is used for each mode to perform processing. However, the color conversion processing section 81 may use two or more matrix tables to form a monochrome image for each of the matrix tables and may combine the formed images. For example, the color conversion processing section 81 generates a monochrome image (herein, assigned as a first image) using the scanned values, the coefficients for emphasizing a blue-based color, and the calculation formula shown in FIG. 4. In addition, the color conversion processing section 81 generates a monochrome image (herein, assigned as a second image) using the scanned values, the coefficients for emphasizing, for example, a green-based color, and the calculation formula shown in FIG. 4. Then the color conversion processing section 81 combines the first image with the second image, and a monochrome image with the blue-based and green-based colors being emphasized can thereby be obtained. The two images are combined by adding their pixel values, but this is not a limitation. Any of various methods can be used.

The following processing may also be used. The scanned values are subjected to a plurality of different types of processing to generate a plurality of monochrome images, and the generated images are combined. For example, the color conversion processing section 81 performs the above-described threshold value processing on the scanned values to generate a monochrome image, and also generates a monochrome image from the scanned values using the formula shown in FIG. 4, and then combines the generated monochrome images.

More specifically, for example, the color conversion processing section 81 selects pixels each having scanned R, G, and B values equal to or smaller than 5 (black or black-based color) using the threshold processing and generates a monochrome image in which the color value of each selected pixel is increased and the color values of the other pixels are reduced or set to 255. The obtained image is used as a third image. In addition, the color conversion processing section 81 performs color conversion processing on the scanned values using coefficients for emphasizing blue-based colors and the calculation formula in FIG. 4 to generate a fourth image. Then the color conversion processing section 81 combines the third image with the fourth image, and a monochrome image with the black-based and blue-based colors being emphasized can thereby be obtained.

In the present embodiment, the memory 803 is used as a storage unit. However, the register of the ASIC 802 may be used as the storage unit, or a combination of these may be used as the storage unit.

As described above, according to the technique described herein, when a document printed with a color material of a specific color is scanned or printed, the document can be reproduced in more appropriate density scale.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
   an acquisition unit configured to scan a sheet that is printed with decolorable color material to acquire a color image of the sheet; and
   a controller configured to convert, using parameters stored in a storage unit, the color image acquired by the acquisition unit to a monochrome image with a specific color that is a color of the decolorable color material being darker than other colors,
   wherein the controller computes a pixel value of the converted monochrome image using
   $R_i \times D_{00} + G_i \times D_{01} + B_i \times D_{02} + R_i^2 \times D_{03} + G_i^2 \times D_{04} + B_i^2 \times D_{05} + R_i \times G_i \times D_{06} + G_i \times B_i \times D_{07} + B_i \times R_i \times D_{08} + D_{09}$
   where $R_i$, $G_i$, and $B_i$ are a red value, a green value, and a blue value, respectively, of a pixel of the color image acquired by the acquisition unit, and $D_{00}$ to $D_{09}$ are the parameters.

2. The image forming apparatus according to claim 1, wherein the controller converts the color image acquired by the acquisition unit to the monochrome image so that the colors other than the specific color are lightened.

3. The image forming apparatus according to claim 1, wherein:
   the specific color is a blue-based color; and
   the controller adjusts a blue value of each of pixels of the color image to a value indicating a color darker than a red value and a green value of the each of pixels.

4. The image forming apparatus according to claim 1, wherein the smallest one of the parameters $D_{02}$, $D_{05}$, and $D_{07}$ is larger than the largest one of the parameters $D_{00}$, $D_{01}$, $D_{03}$, $D_{04}$, $D_{06}$, $D_{08}$, and $D_{09}$.

5. The image forming apparatus according to claim 1, wherein the controller controls a black-based color being darker.

6. The image forming apparatus according to claim 1, further comprising a control panel configured to receive from a user an instruction that specifies one of a plurality of modes, and wherein
   the storage unit stores a plurality of parameters for each of the plurality of modes, and
   the controller acquires a value for the mode received from the control panel, acquires parameters corresponding to the value of the mode from the storage unit, and converts the color image to the monochrome image using the acquired parameters.

7. The image forming apparatus according to claim 6, wherein the control panel includes a plurality of buttons corresponding to the plurality of modes and receives the instruction that specifies one of the plurality of modes when one of the plurality of buttons is pressed.

8. The image forming apparatus according to claim 6, wherein the plurality of modes include: a mode in which the color image acquired by the acquisition unit is converted to a monochrome image with the specific color being darkened; and a mode in which the color image acquired by the acquisition unit is converted to a monochrome image with the specific color and black color being darkened.

9. An image processing method comprising:
   causing an image forming apparatus to scan a sheet that is printed with decolorable color material to acquire a color image of the sheet; and
   causing the image forming apparatus to convert, using parameters stored in a storage unit, the acquired color image to a monochrome image with a specific color that is a color of the decolorable color material being darker than other colors,
   wherein the image forming apparatus computes a pixel value of the converted monochrome image using
   $R_i \times D_{00} + G_i \times D_{01} + B_i \times D_{02} + R_i^2 \times D_{03} + G_i^2 \times D_{04} + B_i^2 \times D_{05} + R_i \times G_i \times D_{06} + G_i \times B_i \times D_{07} + B_i \times R_i \times D_{08} + D_{09}$
   where $R_i$, $G_i$, and $B_i$ are a red value, a green value, and a blue value, respectively, of a pixel of the acquired color image, and $D_{00}$ to $D_{09}$ are the parameters.

10. The image processing method according to claim 9, wherein the image forming apparatus converts the acquired color image to the monochrome image so that the colors other than the specific color are lightened.

11. The image processing method according to claim 9, wherein:
    the specific color is a blue-based color; and
    the image forming apparatus adjusts a blue value of each of pixels of the color image to a value indicating a color darker than a red value and a green value of the each of pixels.

12. The image processing method according to claim 9, wherein the smallest one of the parameters $D_{02}$, $D_{05}$, and $D_{07}$ is larger than the largest one of the parameters $D_{00}$, $D_{01}$, $D_{03}$, $D_{04}$, $D_{06}$, $D_{08}$, and $D_{09}$.

13. The image processing method according to claim 9, wherein the controller controls a black-based color being darker.

14. The image processing method according to claim 9, wherein:
  the image forming apparatus receives from a user an instruction that specifies one of a plurality of modes;
  the storage unit stores a plurality of parameters for each of the plurality of modes; and
  the image forming apparatus acquires a value for the mode, acquires parameters corresponding to the value of the mode from the storage unit, and converts the color image to the monochrome image using the acquired parameters.

15. The image processing method according to claim 14, wherein the image forming apparatus includes a control panel including a plurality of buttons corresponding to the plurality of modes and receives the instruction that specifies one of the plurality of modes when one of the plurality of buttons is pressed.

16. The image processing method according to claim 14, wherein the plurality of modes include: a mode in which the acquired color image is converted to a monochrome image with the specific color being darkened; and a mode in which the acquired color image is converted to a monochrome image with the specific color and black color being darkened.

* * * * *